(12) United States Patent
Tran et al.

(10) Patent No.: US 8,407,531 B2
(45) Date of Patent: Mar. 26, 2013

(54) METHOD OF COLLECTING AND CORRELATING LOCKING DATA TO DETERMINE ULTIMATE HOLDERS IN REAL TIME

(75) Inventors: Loc D. Tran, McLean, VA (US); Gary B. Genest, Morgan Hill, TX (US); Dale J. Stroyick, Richmond, TX (US)

(73) Assignee: BMC Software, Inc., Houston, TX (US)

( * ) Notice: Subject to any disclaimer, the term of this patent is extended or adjusted under 35 U.S.C. 154(b) by 339 days.

(21) Appl. No.: 12/713,970

(22) Filed: Feb. 26, 2010

(65) Prior Publication Data

US 2011/0214024 A1  Sep. 1, 2011

(51) Int. Cl.
*G06F 11/30* (2006.01)
(52) U.S. Cl. ............. 714/57; 714/48; 708/104; 708/107
(58) Field of Classification Search .................. 714/57
See application file for complete search history.

(56) References Cited

U.S. PATENT DOCUMENTS

| | | | | |
|---|---|---|---|---|
| 5,175,852 A * | 12/1992 | Johnson et al. | | 1/1 |
| 5,832,484 A * | 11/1998 | Sankaran et al. | | 1/1 |
| 2002/0156850 A1 * | 10/2002 | Hamscher et al. | | 709/205 |
| 2003/0145146 A1 * | 7/2003 | Posner et al. | | 710/200 |
| 2004/0168154 A1 * | 8/2004 | Yoneda et al. | | 717/124 |
| 2006/0101081 A1 * | 5/2006 | Lin et al. | | 707/200 |
| 2006/0136926 A1 * | 6/2006 | Goldick | | 718/104 |
| 2006/0190453 A1 * | 8/2006 | Colrain et al. | | 707/8 |
| 2006/0206901 A1 * | 9/2006 | Chan | | 718/107 |
| 2006/0225078 A1 * | 10/2006 | Anderson | | 718/104 |
| 2006/0253856 A1 * | 11/2006 | Hu et al. | | 718/104 |
| 2007/0011667 A1 * | 1/2007 | Subbiah et al. | | 717/148 |
| 2007/0061487 A1 * | 3/2007 | Moore et al. | | 709/246 |
| 2008/0209422 A1 * | 8/2008 | Coha | | 718/102 |
| 2008/0282244 A1 * | 11/2008 | Wu et al. | | 718/100 |
| 2008/0294648 A1 * | 11/2008 | Lin et al. | | 707/10 |
| 2009/0254560 A1 * | 10/2009 | Klein et al. | | 707/9 |
| 2009/0307707 A1 * | 12/2009 | Gellerich et al. | | 718/107 |
| 2010/0153529 A1 * | 6/2010 | Moser | | 709/223 |
| 2010/0161573 A1 * | 6/2010 | Chan et al. | | 707/704 |
| 2010/0186013 A1 * | 7/2010 | Harrop | | 718/100 |
| 2010/0242050 A1 * | 9/2010 | Chan | | 718/108 |
| 2010/0262590 A1 * | 10/2010 | Holt | | 707/704 |

* cited by examiner

*Primary Examiner* — Chae Ko

(57) ABSTRACT

A technique for collecting and correlating locking data collects and correlates information on a plurality of programs waiting on or holding a plurality of resources in a multi-computer database system. The technique identifies a program executing on one computer of the multi-computer database system that is waiting on a resource. The technique also identifies a second program, executing on another computer, as the ultimate holder of the resource. An operator display screen displays information corresponding to the first program and the second program. The operator display screen may be switched between a multiline display format and a single line display format. The collection, identification, and display of the locking data is performed periodically, to allow the operator to discover locking problems and take a desired corrective action.

20 Claims, 12 Drawing Sheets

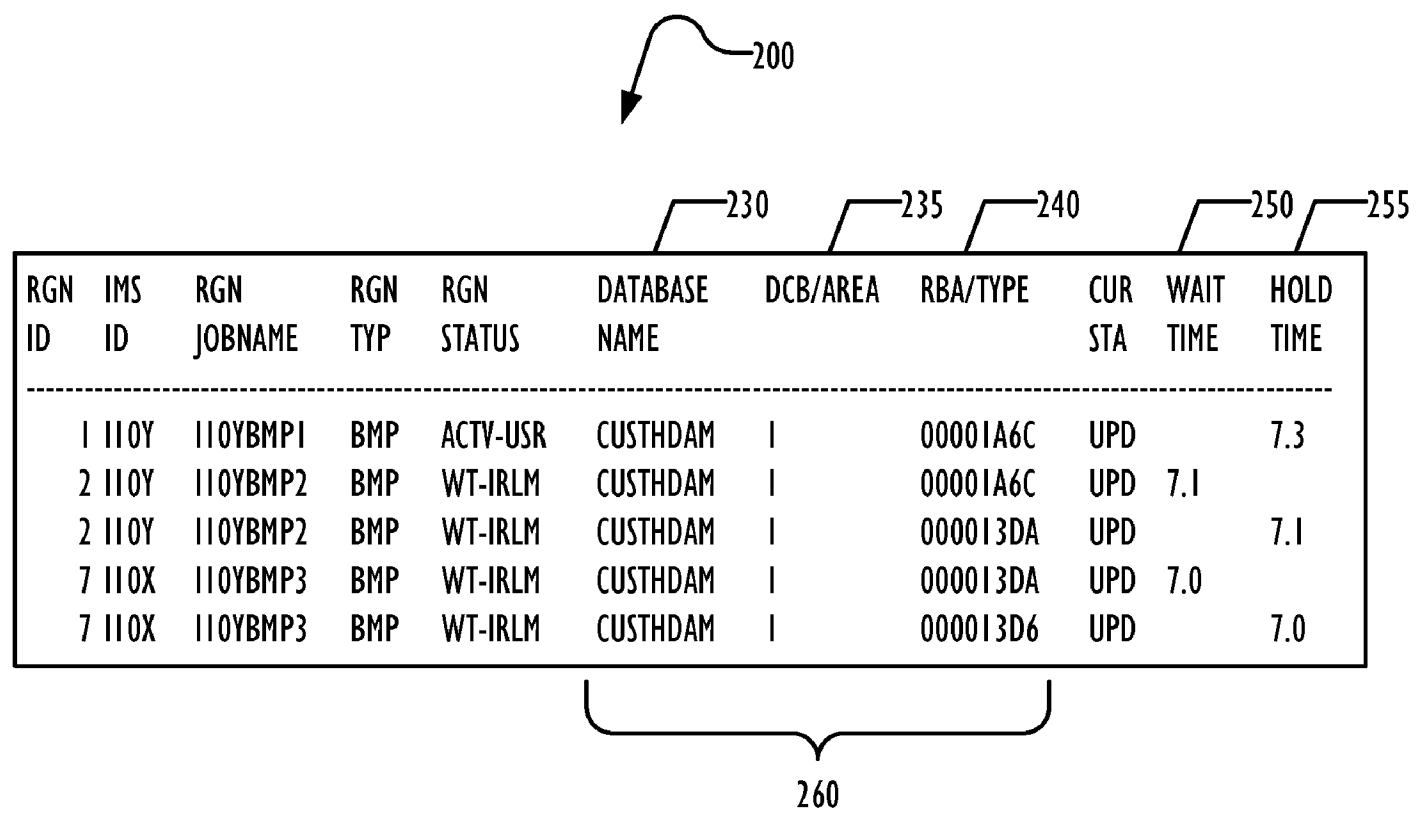

| RGN ID | IMS ID | RGN JOBNAME | RGN TYP | RGN STATUS | DATABASE NAME | DCB/AREA | RBA/TYPE | CUR STA | WAIT TIME | HOLD TIME |
|---|---|---|---|---|---|---|---|---|---|---|
| 1 | 110Y | 110YBMP1 | BMP | ACTV-USR | CUSTHDAM | — | 00001A6C | UPD | | 7.3 |
| 2 | 110Y | 110YBMP2 | BMP | WT-IRLM | CUSTHDAM | — | 00001A6C | UPD | 7.1 | |
| 2 | 110Y | 110YBMP2 | BMP | WT-IRLM | CUSTHDAM | — | 000013DA | UPD | | 7.1 |
| 7 | 110X | 110YBMP3 | BMP | WT-IRLM | CUSTHDAM | — | 000013DA | UPD | 7.0 | |
| 7 | 110X | 110YBMP3 | BMP | WT-IRLM | CUSTHDAM | — | 000013D6 | UPD | | 7.0 |

FIG. 7

```
>W1  =ILKULLST=========I10YIMS==*=======21SEP2009==11:18:46===MVIMS====U====4
+                              IRLM ULTIMATE HOLDER LIST
CMD +-- WAITERS     ----+ WAIT  +-- ULTIMATE ----+ RGN   RGN PSB            TRAN
--- ID  JOBNAME  IMSID TIME     ID  HOLDER  IMSID STATUS    TYP NAME        NAME
    2   I10YBMP2 I10Y  192                        WT-IRLM   BMP PTEST02     GBGTRNB2
                                1   I10YBMP1 I10Y ACTV-USR  BMP PTEST02     GBGTRNB2
    7   I10YBMP3 I10X  191                        WT-IRLM   BMP PTEST02     GBGTRNB2
                                1   I10YBMP1 I10Y ACTV-USR  BMP PTEST02     GBGTRNB2
```

FIG. 9

```
>W1  =ILKULTWT=====I10YIMS==*======21SEP2009==11:27:47====MVIMS====U====2
+                            IRLM WAIT WITH ULTIMATE HOLDER
CMD RGN REGION    RGN PSB    TRAN     WAIT CNT ULT ULTIMATE DATABASE
--- ID  JOBNAME   TYP NAME   NAME     TIME ULT RGN JOBNAME  NAME     DCB
    2   I10YBMP2  BMP PTEST02 GBGTRNB2 201  1   1   I10YBMP1 CUSTHDAM 1
    7   I10YBMP3  BMP PTEST02 GBGTRNB2 200  1   1   I10YBMP1 CUSTHDAM 1
```

METHOD OF COLLECTING AND CORRELATING LOCKING DATA TO DETERMINE ULTIMATE HOLDERS IN REAL TIME

BACKGROUND

This disclosure relates generally to the field of computer databases. More particularly, but not by way of limitation, it relates to a technique for determining ultimate holders of a lock in real time.

Data locking is an important feature of database systems to preserve the integrity of data in the database. Typically, as a program updates a database, the blocks that are updated will be "locked" by a lock manager such that other requesting programs will not be allowed to update the block until the "lock" is released by the updating program that holds the lock.

From time to time, however, conditions occur where something happens that causes a lock not to be released in a timely manner. In systems where multiple computers share a common database, users of one computer may not be able to see that a lock is being held by a program running on another computer in the complex.

In addition, a holder of a lock may also be waiting on a lock that is held by another holder. The user may not have visibility of the actual (ultimate) holder that may be causing the problem. Managing this environment to ensure that all transactions are running optimally has been difficult.

In an online environment where transactions can reach in the thousands per second, knowing who is actually holding the lock on the database block that slows down the whole system becomes very important. In some systems, for example, a locking problem that causes a program to wait for a lock for one minute may cause restarting all or large portions of high-volume transactional systems. Operators of such systems have had difficulty in discovering information needed to solve locking problems in the often short times before such problems cause system-wide failures.

SUMMARY

In one embodiment, a method is disclosed. The method comprises collecting a first information on a plurality of programs waiting on or holding a plurality of resources in a multi-computer database system; identifying a first program of the plurality of programs, executing on a first computer of the multi-computer database system, that is waiting on a first resource of the plurality of resources; identifying a second program of the plurality of programs, executing on a second computer of the multi-computer database system, as the ultimate holder of the first resource; and displaying a second information corresponding to the first program and the second program, wherein the acts of collecting a first information, identifying a first program, identifying a second program, and displaying a second information are automatically performed on a periodic basis.

In another embodiment, a computer-readable medium is disclosed. The computer-readable medium has instructions for a programmable control device stored thereon wherein the instructions cause a programmable control device to perform the method described above.

In yet another embodiment, a networked computer system is disclosed. The networked computer system comprises a plurality of computers communicatively coupled, at least one of the plurality of computers programmed to perform at least a portion of the method described above wherein the entire method described above is performed collectively by the plurality of computers.

BRIEF DESCRIPTION OF THE DRAWINGS

FIG. 7 illustrates, in table form, an example sort of the data table of FIG. 2.

FIG. 9 illustrates an example operator screen display indicating ultimate lock holders according to one embodiment.

DETAILED DESCRIPTION

Figure 1:
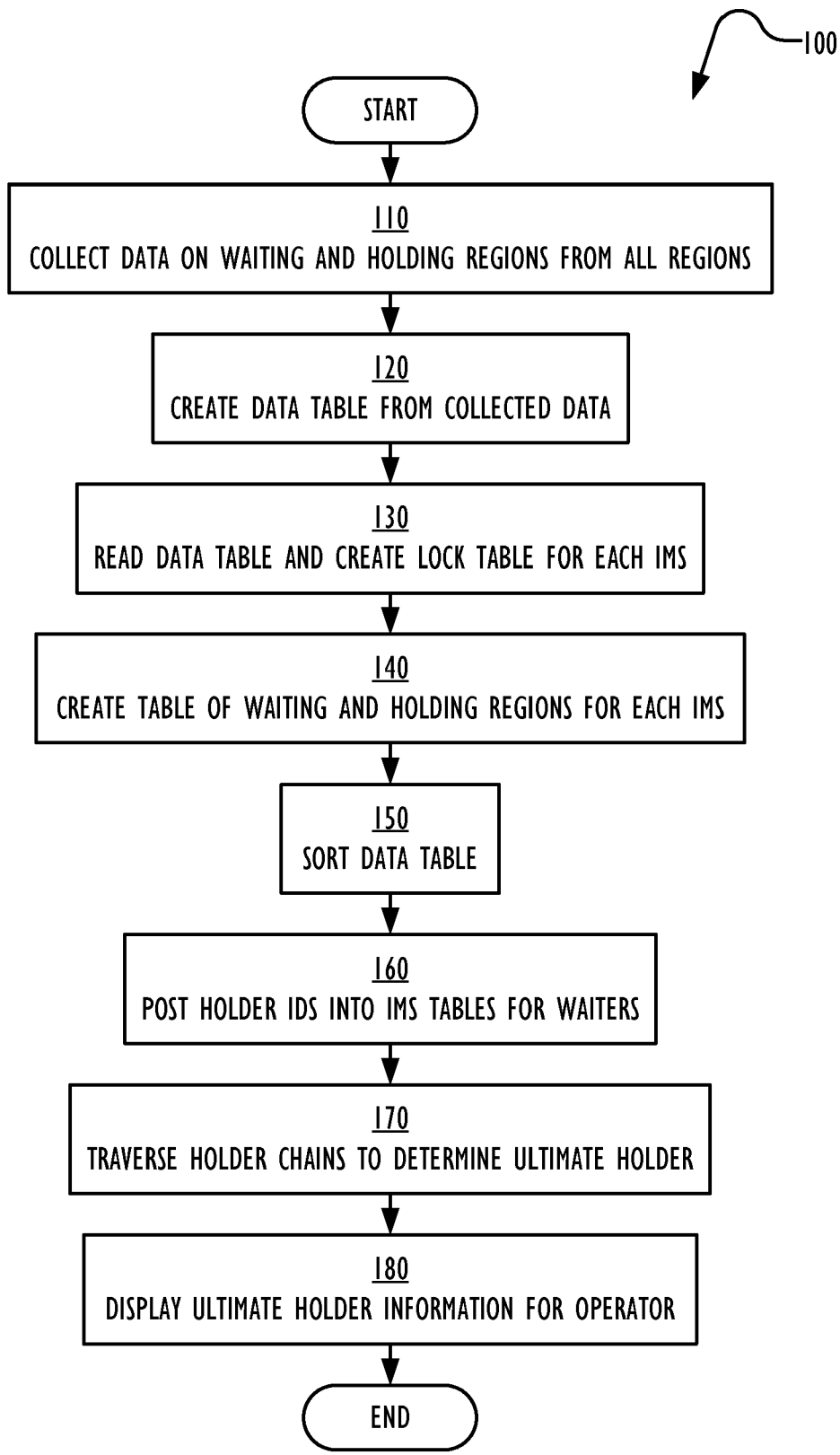
FIG. 1 illustrates, in flowchart form, an example of a technique for determining and displaying the ultimate holder of a lock according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The following description is written in terms of an Information Management System (IMS) database system developed and marketed by International Business Machines Corp. (IBM). The present invention is not limited to IMS databases, however, and the disclosed techniques may be used in other databases, including the DB2® database system also developed and marketed by IBM. (DB2 is a registered trademark of IBM.)

The Internal Resource Lock Manager (IRLM) is an IMS database address space that regulates database updates in a data-sharing environment. It can control updates from multiple IMS subsystems that may be running on different Z/OS® operating systems. (Z/OS is a registered trademark of IBM.) Each IMS in the data-sharing environment may run a separate copy of the IRLM.

As a program updates a database, the blocks that are updated are "locked" by the IRLM such that other requesting programs will not be allowed to update the block until the "lock" is released by the updating program that holds the lock.

In an IMS database environment, the IMS subsystem uses regions for processing transactions for programs that use database facilities. A control region oversees the operation of dependent regions that are used for processing database transactions for programs that use IMS databases. Although the following disclosure is written using IMS region terminology, the techniques disclosed herein may be used in any database system where programs or transactions may be waiting on or holding a lock, to find the ultimate holder of the lock.

A dependent region may be considered a "holder" region when it holds a lock for a database block that has been requested by another dependent region. The dependent region that is requesting the database block may be considered a "waiting" region until the holder region releases the locked database block. A waiting region may have multiple holders for a lock. If the lock is held by a holder region that runs in a different IRLM, the user may not be able to see the holder region.

If the holder region holding a lock on which a waiting region is waiting is not itself waiting on another lock, then the holder region is the immediate holder of the lock, and may also be considered the ultimate holder of the lock for the waiting region. Alternatively, the immediate holder region may itself be waiting on another lock, and a chain of regions may exist between the waiting region and the ultimate holder of the lock. If each of that chain of regions is waiting on only one lock, then releasing the lock held by the ultimate holder may allow all of the chain of regions to stop waiting. If any of the chain of regions is waiting on more than one lock, however, releasing the lock by all of its ultimate holders may be required to allow the waiting region to stop waiting.

A method of collecting all lock data from each IMS subsystem in an IRLM sharing environment (even across different z/OS operating systems) is disclosed below. The data may then be correlated to determine the ultimate holder(s) for each waiting region (transaction). The data may be presented in a display facility in real-time so that the user can determine and take the correct business action against the offender known as the "ultimate" holder.

FIG. 1 is a flowchart illustrating a technique 100 for determining and displaying the ultimate holder information for an operator of a computer system. In block 110, data on waiting and holding regions may be collected from each IMS in the IRLM data-sharing environment. In block 120, a data table may be created from the collected data. In block 130, the data table may be read and a lock table may be created for each IMS in the IRLM data-sharing environment. In block 140, an IMS table may be created for the waiting and holding regions of each IMS in the IRLM data-sharing environment. In block 150, the data table may be sorted.

In block 160, holder ID information may be placed into the IMS tables in rows corresponding to the regions. In block 170, the holder chains may be traversed from the waiting region, to determine the region that is the ultimate holder of a lock.

Finally, in block 180, the ultimate holder information may be displayed for the operator in a way that allows the operator to take corrective action to clear the lock held by the ultimate holder. In some embodiments, software managing the operator display may allow for rules and alarms to automate the operators responses to the ultimate holder information.

The above technique is described in more detail below.

In one embodiment, each IMS subsystem in the IRLM sharing environment is monitored by a MAINVIEW for IMS Product Address Space (PAS) software provided by BMC Software, Inc. A PAS allows multiple users to retrieve information related to that IMS subsystem. Other techniques may be used for obtaining the data buffers described below for use in the determination of the ultimate holder of locks, including software to query IRLM control blocks directly.

When a user requests a display of all regions (transactions) that are waiting, a new collecting program is dispatched. This program runs in the local PAS and sends a request to all participating IMS/PAS environments to provide information concerning all waiting and holder regions. The data from each PAS is returned to the program via a data buffer. The program may then group the data by IMS Control region. A single waiting region may be waiting on multiple holders.

In one embodiment, the data in the buffer includes: IMS ID, Region ID, Region Jobname, Region status, the involved lock resource (database name, DCB or Area name, and the Relative Byte Address (RBA) of the Control Interval (CI)), the wait time of the region if the region is a waiter or the hold time of the region if the region is a holder. A region may have a region status of WT-ILRM if it is waiting on a lock. A region may be both a holder and a waiter. Other information may be passed to the PAS program in the data buffer, such as a Program Specification Block (PSB) name and a transaction name.

The PAS program may then pass the data buffer to a correlating program to perform the correlation. The correlating program may then correlate the data from the data buffer and generate a display showing an operator the ultimate holder of a lock. The operator may then take whatever corrective action is desired.

The data buffer received by the correlating program may be stored in a newly created data table then parsed for each IMS in the data-sharing group found in the data table. Each row of the data table may include the data described above (in the data buffer).

When complete, the data table will have been created as illustrated below in FIG. 2. In this example, there are 2 IMS systems participating in the data-sharing environment (I10Y and I10X).

Figure 2:
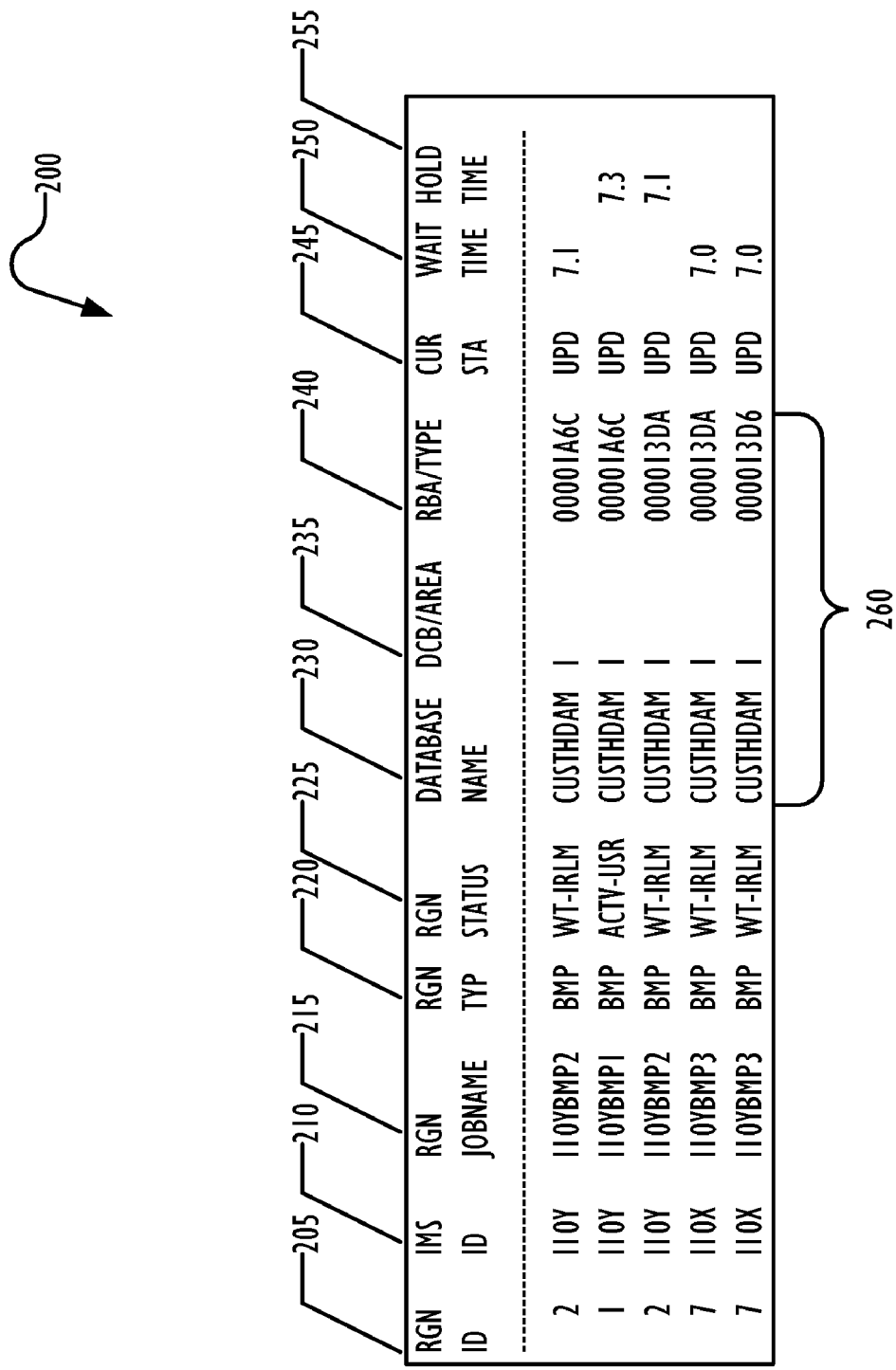
FIG. 2 illustrates, in table form, an example of data collected for determining the ultimate holder of a lock according to one embodiment.

FIG. 2 is a table illustrating an example data table 200 created according to one embodiment. Each row contains data for an IMS region. Column 205 contains a region ID. Column 210 contains an IMS ID. Column 215 contains a job name associated with the region. Column 220 contains a region type identifier. Column 225 contains an indicator of whether the region is waiting (WT-ILRM) or active (ACTV-USR). Column 230 contains a name for the database. Column 235 contains an IMS DCB or Area name. Column 240 contains a relative byte address data. Column 245 contains a current status indicator (typically, "UPD," indicating that the region is attempting to update a block). Column 250 indicates how long the region has been waiting on a lock. Column 255 indicates how long the region has been holding a lock. Columns 230, 235, and 240 define a resource 260 on which a region may be waiting or on which the region may be holding a lock. If the data buffer collected additional information, that information may also be stored in the rows of the data table 200.

There are five rows in the example data table 200 of FIG. 2. Two IMS's are shown in the table, I10Y and I10X. IMS I10Y is illustrated with two regions waiting or holding a lock, regions 1 and 2. IMS I10X is illustrated with only a single region waiting or holding a lock, region 7. Four of the regions are illustrated as waiting because of the WT-ILRM indication in the region status column 225, while one region (region 1 of IMS I10Y) is currently active (as shown by the ACTV-USR indication in the region status column 225). Two regions are shown as holding locks (region 1 of IMS I10Y and region 2 of IMS I10Y), based on the hold time indication in column 255. Region 2 of IMS I10Y is illustrated in two rows, one having a status indicating that it is waiting on a resource, based on the wait time in column 225, and a second row indicating that it is holding a lock for another resource, based on the hold time in column 255. Thus, region 2 of IMS I10Y is both a waiter and a holder.

After the data table 200 is created, lock tables 300 may be created for each IMS found in the data table 200. In one embodiment, each IMS system can have up to 999 regions; therefore, a lock table with 999 rows may be created to contain all the waiter or holder regions from the data table 200. In one embodiment, such as illustrated in FIG. 2, the data table 200 may be sorted by IMS ID and region ID, so that it may be read sequentially to build each lock table 300 as described below. The highest region ID (from 1 through 999) discovered in the data table 200 for each IMS may be saved for use later.

Figure 3:
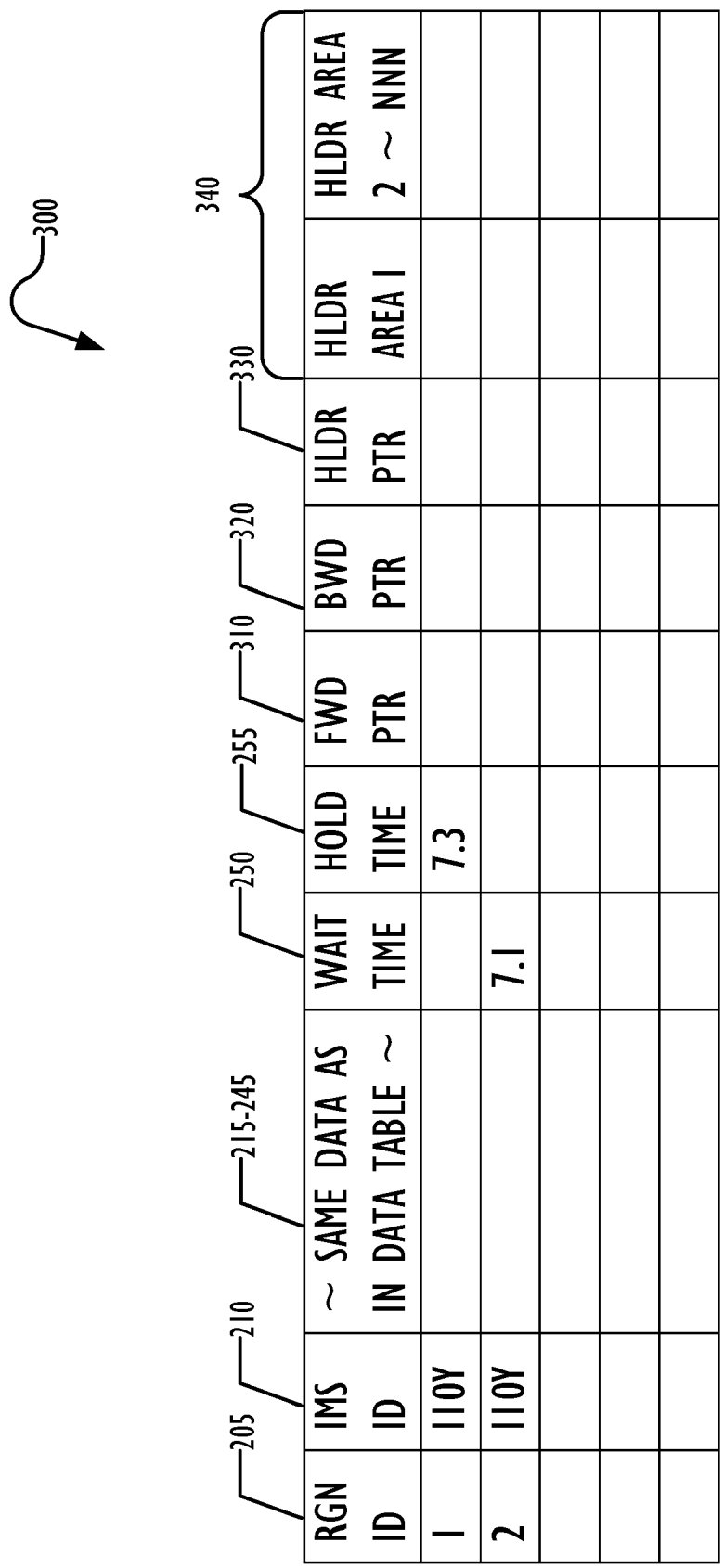
FIG. 3 illustrates, in table form, an example of a lock table created from the data table of FIG. 2 according to one embodiment.

In one embodiment, illustrated in FIG. 3, the data in each row of the data table 200 may be copied to a lock table 300 as the prefix of each row of the lock table 300. In FIG. 3, columns 215-245 are elided for clarity and are illustrated simply as "~SAME DATA AS IN DATA TABLE~." The remainder of each row is not used during the creation of the lock table 300, but provides a data structure for the creation of the IMS tables as described below. The second part of each row may include three pointers: a forward pointer 310, a backward pointer 320, and a holder area pointer 330. The second part of each row may also include one or more holder areas 340.

In one embodiment, the number of holder areas 340 may be defined depending on the total number of regions defined for all the IMS systems being monitored. Thus if IMS I10Y is defined with six regions and IMS I10X is defined with four regions, then ten holder areas 340 may be defined in each row. In other embodiments, the number of holder areas 340 may be fixed at a pre-determined number of holder areas, such as 200 holder areas 340.

When all the rows for each IMS are read, a new IMS table may be created from the lock table 300 for that IMS and the number of rows in the IMS table may be based on the highest region ID for that IMS that was determined previously, to minimize the amount of space required for each IMS table. As seen in the examples below, rows corresponding to region IDs not found in the data table 200 or lock table 300 will be left empty in the IMS table. Once the IMS table is created, the lock table 300 may be cleared and reused to hold the data for the next IMS to be processed from the data table 200. After the entire data table 200 has been processed, each participating IMS with waiter or holder regions will have one IMS table.

An IMS index table may be created to hold information regarding the IMS tables. In one embodiment, 32 IMS systems can participate in an IRLM data-sharing environment, so an IMS Index table with thirty-two entries is created. Each time a new IMS table is built, the IMS ID, the IMS table address, and the highest dependent region ID associated with that IMS are saved in the IMS Index table.

Figure 4:
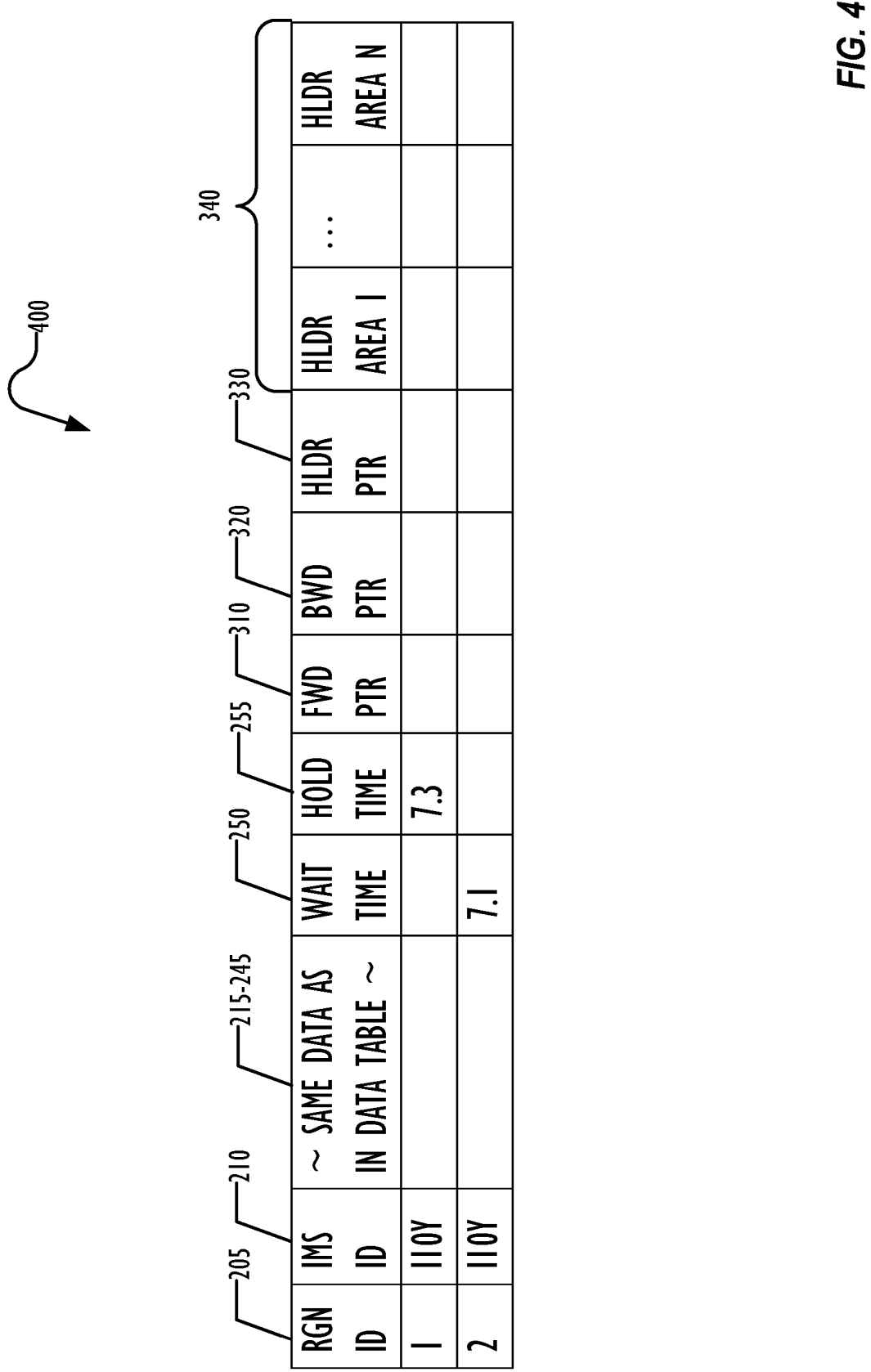
FIG. 4 illustrates, in table form, an example of an IMS table created from the lock table of FIG. 3 according to one embodiment.
Figure 5:
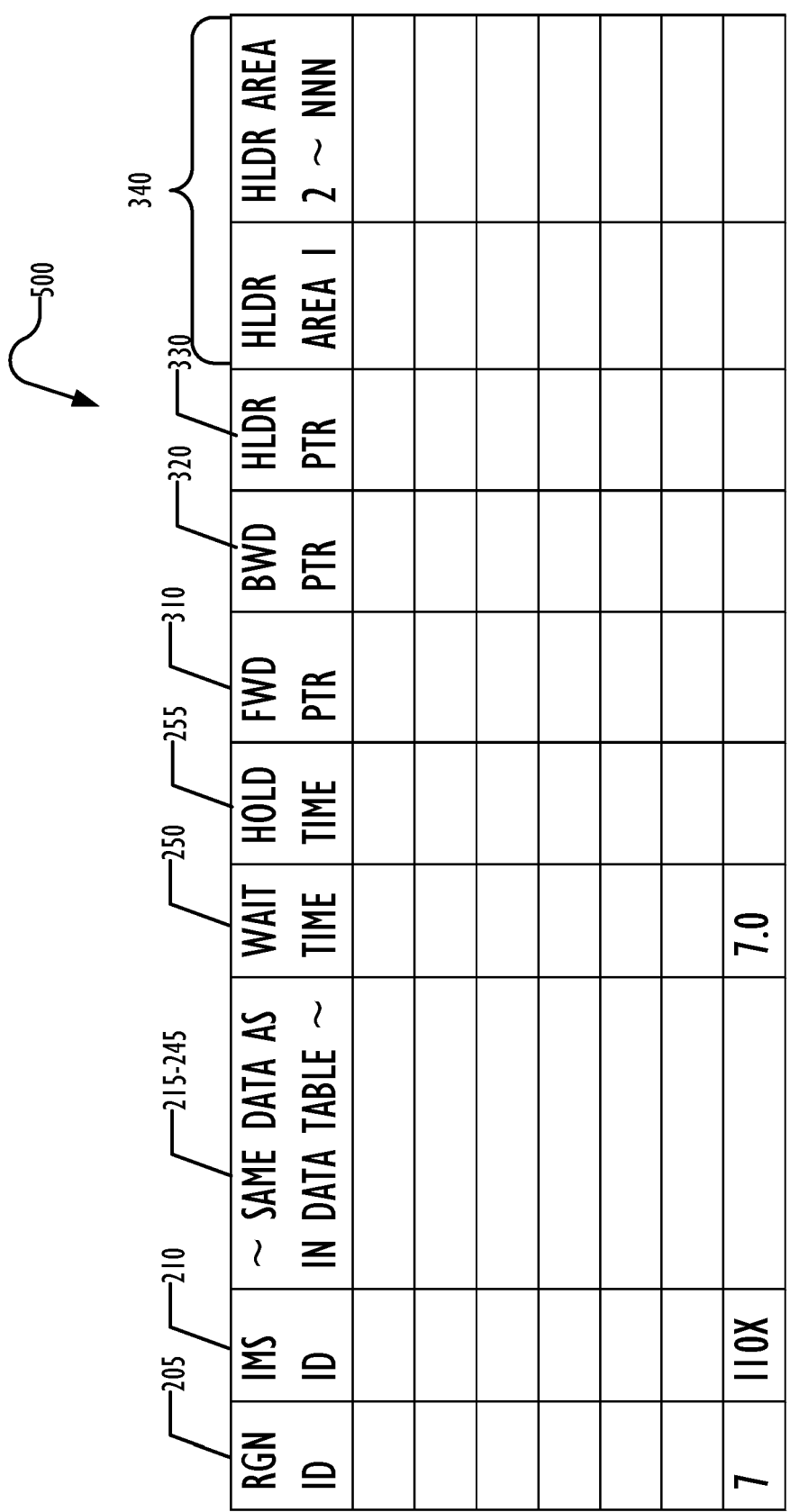
FIG. 5 illustrates, in table form, an example of an IMS table for another IMS created from the data table of FIG. 2 according to one embodiment.

FIGS. 4 and 5 illustrate two example IMS tables created from the example data table 200. The columns of each IMS table are the same as of the lock table 300. IMS table 400, created for IMS I10Y, has only two rows of data, one for each IMS region ID of IMS I10Y. In one embodiment, IMS table 500, created for IMS I10X, has seven rows (highest region ID), because the highest region ID for IMS I10X in the data table 200 is region ID 7; however, rows 1 through 6 are empty. By including empty rows for region IDs 1-6, accessing an element of the table may be a simple table index, instead of requiring a search for a row with the desired region ID.

Figure 6:
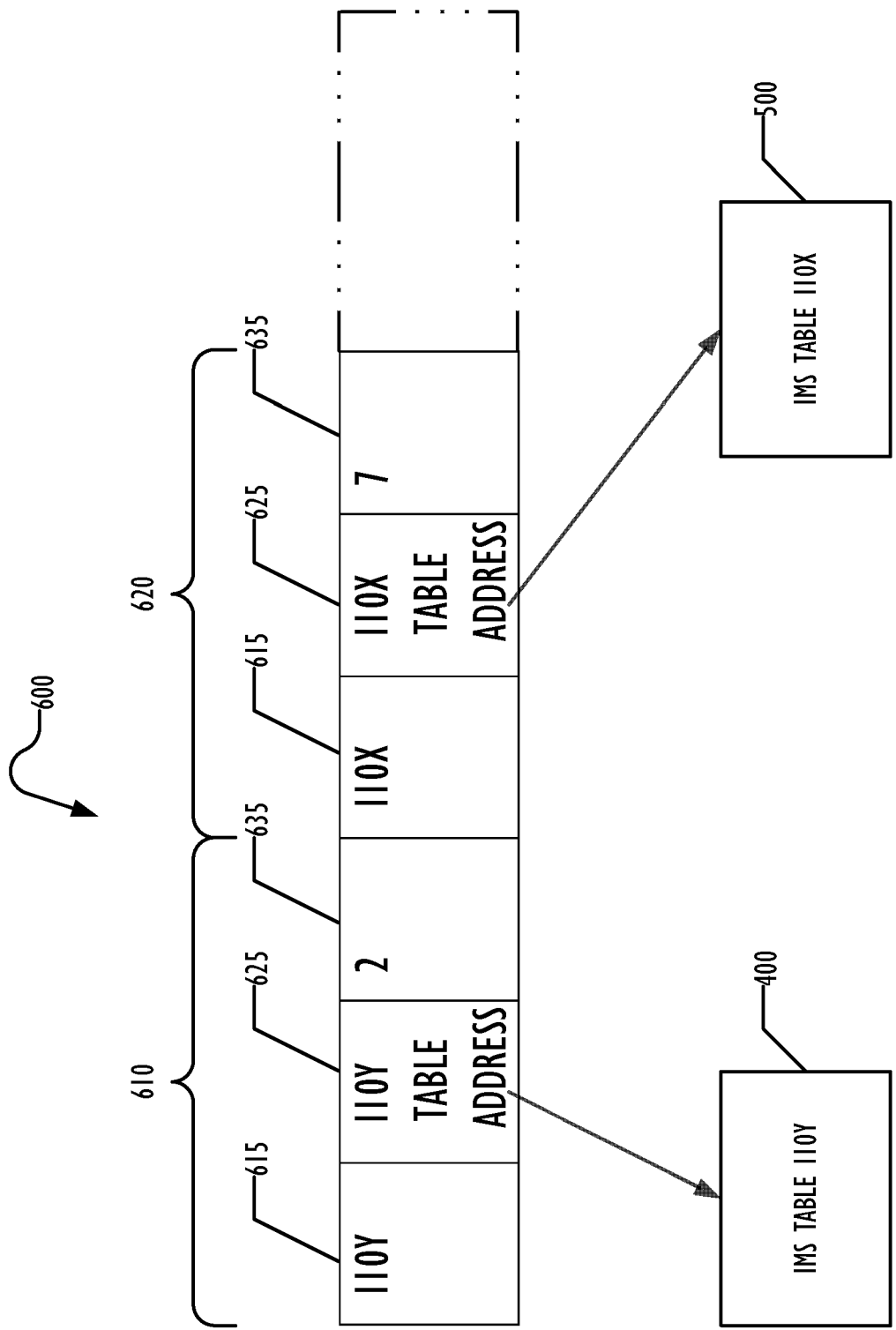
FIG. 6 illustrates, in block diagram form, an example of an index table created for the IMS tables of FIGS. 4 and 5 according to one embodiment.

FIG. 6 is a block diagram illustrating an example IMS index table 600, with two entries 610 and 620, one for each of the example IMS tables 400 and 500. Although the index table 600 may be created with 32 entries, only the two entries 610 and 620 are illustrated for clarity. In this example, each of the two entries 610 and 620 contain three fields: IMS ID field 615, and IMS table address 625, and a highest region ID field 635. Thus in entry 610, the IMS ID field 615 contains I10Y, the IMS table address field 625 contains the address of IMS table 400, and the highest region ID field 635 indicates the highest region ID for IMS I10Y is 2. Similarly, in entry 620, the IMS ID field 615 contains I10X, the IMS table address field 625 contains the address of IMS table 500, and the highest region ID field 635 indicates the highest region ID for IMS I10X is 7.

Next, the data table 200 rows may be sorted in one embodiment in the following order:
(a) Database (230), (b) DCB/Area (235), (c) RBA (240), (d) Holder time (255), and (e) Waiter time (250). This sort effectively sorts the data table 200 according to the resources 260 identified in the data table 200, with holders sorted before waiters. After the sort, the example data table 200 of FIG. 2 is illustrated in FIG. 7. As can be seen in FIG. 7, there are three resources 260 in the data table 200, (CUSTHDAM, 1, 00001A6C), (CUSTHDAM, 1, 000013DA), and (CUSTHDAM, 1, 000013D6). This sorting allows easy traversal of the data table 200 for finding the ultimate holder region of a waiter region.

In one embodiment, as the data table 200 is traversed, each row of the data table 200 is examined. If the region in that row is a holder region, as indicated by a non-zero hold time in column 255, the address of the row of the IMS table corresponding to the region holding the resource is determined. For every row in the data table 200 waiting for a resource, the appropriate IMS table row is located and the address of the holder row is stored in one of the holder areas 340 of the row corresponding to a waiter region. In one embodiment, the holder pointer 330 is initialized in each row of the IMS table to point to the first holder area 340. As each holder region row address is stored in a holder area 340, the holder pointer 330 is incremented to point to the next holder area.

After traversing the data table 200 to update the holder areas 340 of the IMS tables, the data table 200 is no longer required and may be deleted.

Figure 8:
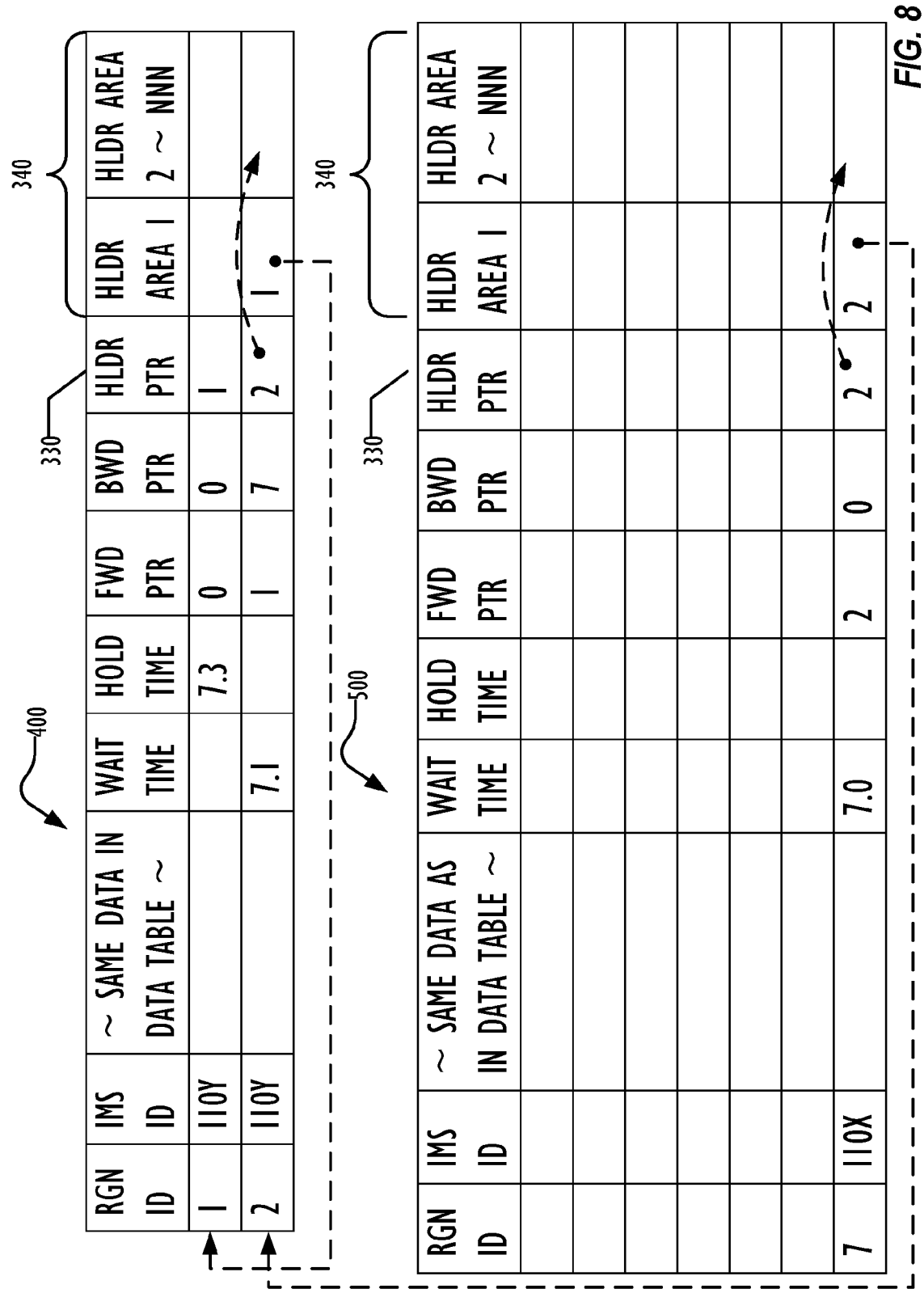
FIG. 8 illustrates, in table form, an example updated IMS table corresponding to the table of FIG. 4.

FIG. 8 illustrates the updated state of IMS tables 400 and 500 after all waiter regions have had their holder areas updated. For clarity of the drawing, instead of showing an actual address, the corresponding region ID of the holder region is illustrated together with an arrow pointing to the IMS table row corresponding to the holder region.

Thus, in FIG. 8, region 2 of IMS ID I10Y is waiting on the holder region ID 1 of IMS ID I10Y, while region 7 of IMS ID I10X is waiting on the holder region ID 2 of IMS ID I10Y, each of which information is stored in the first holder area 340 of the respective IMS table. These holder regions are the immediate holder regions, and may not be the ultimate holder regions. Because in the example system of FIG. 8, only one immediate holder regions exists for any waiting region, the holder pointers 330 of the waiter row are illustrated with a "2" and an arrow pointing to the second holder area 340.

To recap what we have done so far. We created an IMS table for each participating IMS in the data-sharing environment. Each row in the IMS table represents a dependent region. The dependent region can be a holder or waiter. If it is a waiter, the holder areas of the row were populated with each holder's IMS table address and dependent region ID. Now, we have enough data to resolve the ultimate holder(s) for each IMS region that is waiting for a resource for all of the IMS tables.

By using the IMS Index table, the address of an IMS table may be found. For each IMS table, each non-empty row may be examined. If the row is a holder, indicated by a non-zero hold time field 255, it may be skipped. If the row is a waiter, indicated by a non-zero wait time field 250, the dependent region information including the wait time may be captured for display on an operator screen as described below. Then the holder area(s) 340 of the waiting region row may be examined. The IMS table addresses from each non-empty holder area are used to look for the holder information.

The IMS table row at the address pointed to by the holder area is then examined. In one embodiment, the forward pointer 310 of the waiter region row is updated with the address of the holder pointed to by the holder area before examining the IMS table row pointed to by that holder area, and the backward pointer 320 of the holder pointed to by the holder area may be updated in the IMS table row for that region, to allow navigation backwards and forward along the chain of regions considered in the search for the ultimate holder.

If the holder region status is not "WT-IRLM," this holder is determined to be the ultimate holder for the current waiter. The ultimate holder's region information including the holder time may be written to the display on the next line. If the holder region status is "WT-IRLM," this holder is not the ultimate holder of this waiter row. It may be considered an intermediate holder. The program may then examine the next holder area region by following the holder area pointer of the intermediate holder row. In other words, the intermediate holder row will be examined just as we examined the previous waiter row. This process is repeated until the true ultimate holder is found. The backward and forward pointers on each row are used for navigational purposes when searching the chain.

Because a waiter region may be waiting on multiple ultimate holders, as indicated by the presence of more than one non-empty holder area in the IMS table row for the waiter region, the chain of holders for each holder area may be traversed, and each multiple holder indicated in the operator display as an ultimate holder. As each chain of holders starting from a holder area pointer is considered, the backward and forward pointers 320 and 310 may be updated for that chain, overwriting pointer information that was written for the previous ultimate holder search for that waiter region.

It is possible to have a waiter region without being able to determine an ultimate holder region. A possible cause for this is that not all of the IMS systems in the data-sharing environment returned data for the data buffer that was stored in the data table 200. For example, there was a communication failure or the PAS was unavailable. In that situation, in one embodiment, the operator display will indicate the waiter region, but not indicate a holder region. In other embodiments, a line may be inserted into the display to indicate the absence of ultimate holder information. Other actions may be taken when no ultimate holder can be determined as desired.

A deadlock situation can happen when region A holds resource A and waits for resource B while Region B holds resource B and wait for resource A. The present invention does not attempt to prevent deadlocks, but an existing deadlock situation is preferably detected to prevent an infinite loop that may otherwise occur in the attempt to determine an ultimate holder. In one embodiment, any time a holder is determined to be an intermediate holder, the intermediate holder's immediate holder may be checked to see if the immediate holder can be found in the chain of holders previously considered. In one embodiment, the backward pointer field is used for this purpose, traversing the chain of regions that have been considered up to this point, to make sure that the immediate holder has not already been considered previously. Thus, in the example above, then region B is determined to be an intermediate holder, with A as its immediate holder, the backward pointer field 320 is traversed, discovering region A has already been considered. Other deadlock detection techniques known to the art may be used as desired.

If a deadlock is detected, in one embodiment the intermediate holder is added to the display as if it were the ultimate holder, and the waiter and holder regions may be flagged with "Deadlock" or some other indication that a deadlock has occurred.

Figure 10:
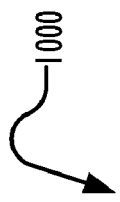
FIG. 10 illustrates an example alternate operator screen display indicating ultimate lock holders according to one embodiment.

In the example IMS tables of FIG. 8, the technique described above will first examine row 1 of the IMS table for IMS I10Y. Because that region is an active region, it is ignored. Row 2, which is a waiter region, is then considered. Region from the IMS table 400 relating to region 2 is written to the operator display, as indicated in FIG. 10. The first (and only, in this example) holder area 340 points to region 1 of IMS I10Y. That region is then examined and determined to be the ultimate holder, because it is an active region. Therefore, information relating to region 1 of IMS I10Y is written to the operator display in the ultimate holder fields, as indicated in FIG. 10. The backward pointer chain may then be used to move back to the waiter region 2 of IMS I10Y. There are no more non-empty holder areas for region 2 of IMS I10Y, so we are finished with that waiter region. There are no other waiter regions in the IMS table 400, so the program now examines IMS table 500, for IMS I10X. The only non-empty row of IMS table 500 is the row for region 7, which is a waiter. The region 7 information is copied to the operator display as illustrated in FIG. 10. The first holder area 340 is examined to find a pointer to the row of IMS table 400 for region 2 of IMS I10Y. Because it is also a waiter region, it is an intermediate holder, not an ultimate holder, and the traversal of its holder areas may be performed as described above, eventually discovering that region 1 of IMS I10Y is the ultimate holder for region 7 of IMS I10X, thus discovering an ultimate holder in a different IMS than the original waiting region. Thus, region 1 of IMS I10Y is added for a second time to the display of FIG. 10, since it is the ultimate holder of a lock waited on by both region 2 of IMS I10Y and region 7 of IMS I10X.

The correlation process and display of the waiting regions with their ultimate holder regions is then complete, because no other IMS tables or waiting regions need to be considered. The program may therefore free all of the IMS tables, lock table, and IMS Index table.

Timing may be an issue since it involves human decision. However, with this invention, the data is reported in a real-time environment. This allows the user to take appropriate action to resolve the issue. If the lock problem is not taken care of in a timely fashion, there is a high risk that the transactions involved will hit a "Timeout" condition. This condition can cause numerous issues in a busy network such as the possibility of a shutdown and restart of the network server. In one embodiment, the above determination of ultimate holders is performed on a predetermined periodic basis, typically a short period, such as every five seconds. In other embodiments, an operator or an administrator may configure the system to perform the data collection and correlation technique for ultimate holder detection at any desired period. In one embodiment, in addition to or instead of periodic capture and display of ultimate holder information, the determination and display may be performed upon demand. For example, in an embodiment where the above technique is performed every 30 seconds, an operator concerned about a possible problem could initiate the performance of the technique at an intermediate time, in addition to the periodic automatic performance of the technique.

FIGS. 9 and 10 illustrate alternate techniques for displaying the results of the ultimate holder determination described above. In FIG. 9, a multiline display displays waiter information and holder information formatted on multiple lines of a screen 900, providing room for more information that the display of FIG. 10, where screen 1000 displays both waiter and ultimate holder information formatted on a single line. In one embodiment, both screens 900 and 1000 may be available, and the display software may display either screen 900 or screen 1000 upon receiving a display selection indication from an operator. In other embodiments, only one of the screens 900 or 1000 is available for an operator. The arrangement and formatting of the screens 900 and 1000 are illustrative and by way of example only and any screen format and included information may be used as desired.

In one embodiment, an operator may be able to select information on a display and indicate the action to be performed, such as obtaining additional information regarding the waiter or holder regions selected, or taking a corrective action to attempt to resolve the locking problem for the deadlock indicated on the screen. In some embodiments, the monitor software displaying the screen 900 or 1000 may allow automatic actions to be performed upon data being written to the display, such as the force determination of one or more of the waiter or holder regions or one or more of the deadlocked regions.

In one embodiment, a system 1100 includes a plurality of computers 1110, 1120, and 1130, each of which runs IMS database software and applications using one or more IMS databases. A monitor computer 1140, operatively coupled to the computer systems 1110, 1120, and 1130, runs a monitor software 1150 that embodies the techniques described above to monitor and display waiting and holding IMS regions of the IMS software running on the computers 1110, 1120, 1130. In some embodiments, the computer 1140 may also run IMS and applications software or in addition to the monitor software 1150. Storage subsystems 1115, 1125, 1135, and 1145 provide storage for software and data used by the computer systems 1110, 1120, 1130, and 1140, respectively, with the storage subsystem 1140 providing storage for the monitor software 1150. The monitor software 1150 may in some embodiments include software modules that execute on the computer systems 1110, 1120, and 1130 in addition to the monitor software 1150 executing on the computer system 1140. An operator display 1160, which may be any form of display known to the art, including other computer system, may display the screens illustrated in FIGS. 10 and 11 as desired, possibly with other screens or displays.

Figure 11:
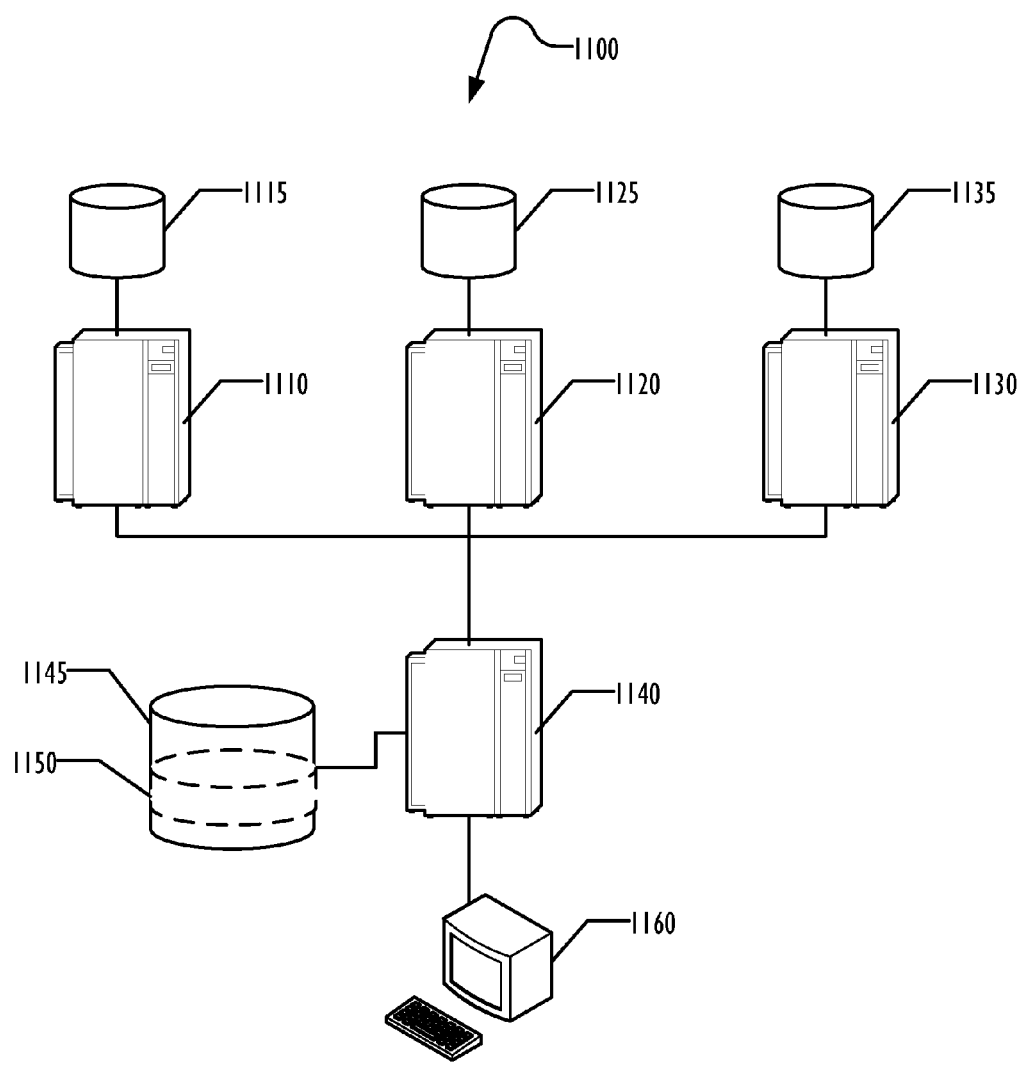
FIG. 11 illustrates, in block diagram form, an example of a multi-IMS system according to one embodiment.

The computer system 1100 of FIG. 11 and the number, connectivity, and arrangement thereof is illustrative and by way of example only, and other numbers, connectivity, and arrangement of elements may be used on embodiments as desired. The monitor software 1150 may be provided for execution on the monitor computer 1140 on any desired computer-readable medium, including optical or magnetic media, for installation on the computer system 1140.

Figure 12:
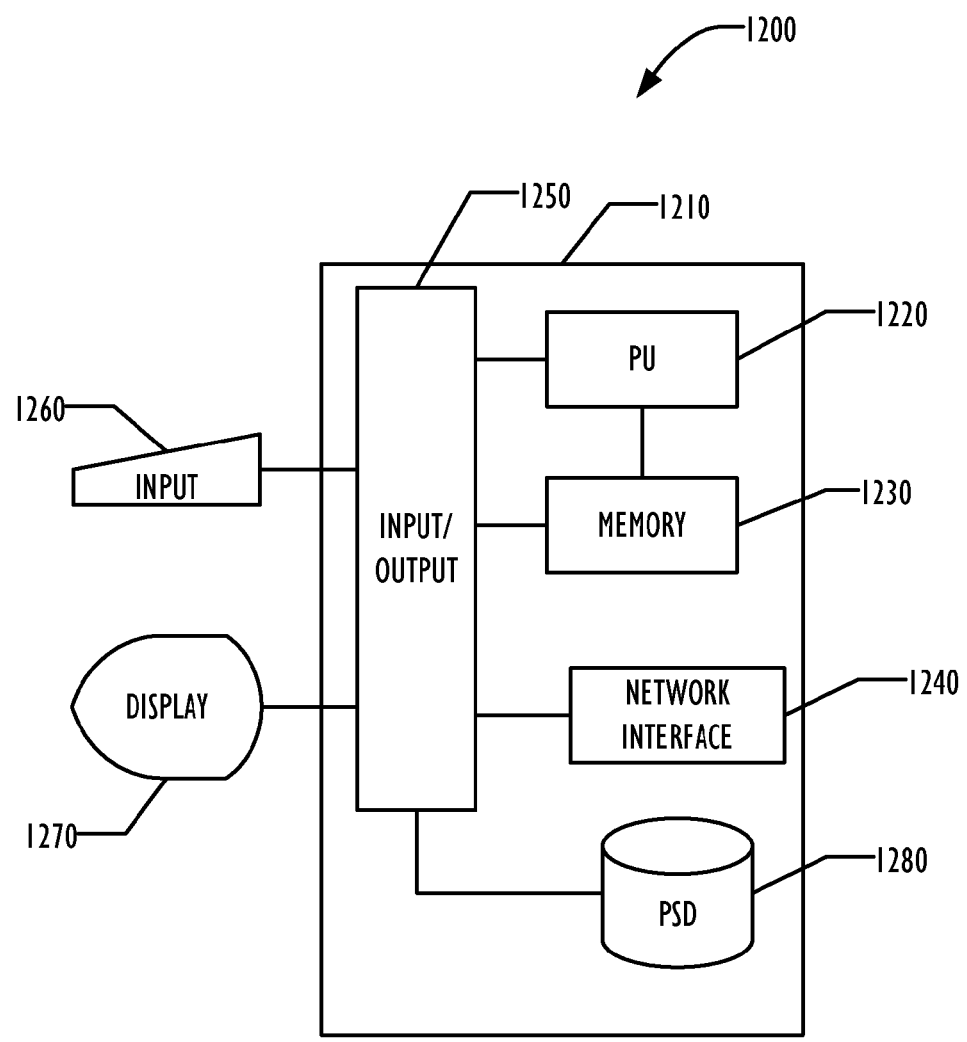
FIG. 12 illustrates, in block diagram form, an example computer system according to one embodiment.

Referring now to FIG. 12, an example computer 1200 for providing the monitor software 11 is shown. Example CMDB server computer 1200 comprises a system unit 1210 which may be optionally connected to an input device or system 1260 (e.g., keyboard, mouse, touch screen, etc.) and display 1270. A program storage device (PSD) 1280 (sometimes referred to as a hard disc) is included with the system unit 1210. Also included with system unit 1210 is a network interface 1240 for communication via a network with other computing and corporate infrastructure devices (not shown). Network interface 1240 may be included within system unit 1210 or be external to system unit 1210. In either case, system unit 1210 will be communicatively coupled to network interface 1240. Program storage device 1280 represents any form of non-volatile storage including, but not limited to, all forms of optical and magnetic storage elements including solid-state storage, including removable media, and may be included within system unit 1210 or be external to system unit 1210. Program storage device 1280 may be used for storage of software to control system unit 1210, data for use by the credential store system 1200, or both.

System unit 1210 may be programmed to perform methods in accordance with this disclosure (an examples of which is in FIG. 1). System unit 1210 comprises a processor unit (PU) 1220, input-output (I/O) interface 1250 and memory 1230. Processing unit 1220 may include any programmable controller device including, for example, one or more members of the Intel Core®, Pentium® and Celeron® processor families from the Intel and the Cortex and ARM processor families from ARM. (INTEL, CORE, PENTIUM, and CELERON are registered trademarks of the Intel Corporation. CORTEX is a registered trademark of the ARM Limited Corporation. ARM is a registered trademark of the ARM Limited Company.) Memory 1230 may include one or more memory modules and comprise random access memory (RAM), read only memory (ROM), programmable read only memory (PROM), programmable read-write memory, and solid-state memory. One of ordinary skill in the art will also recognize that PU 1220 may also include some internal memory including, for example, cache memory.

Similar computer systems may be used as clients for accessing the CMDB server 110, such as the web client 210 and the application client 220 of FIG. 2.

Various changes in the components as well as in the details of the illustrated operational method are possible without departing from the scope of the following claims. For instance, the illustrative system of FIG. 11 may be comprised of more than one computer communicatively coupled via a communication network, wherein the computers may be mainframe computers, minicomputers, workstations or any combination of these. Such a network may be composed of one or more local area networks, one or more wide area networks, or a combination of local and wide-area networks. In addition, the networks may employ any desired communication protocol and further may be "wired" or "wireless." In addition, acts in accordance with FIG. 1 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
   collecting a first information on a plurality of programs waiting on or holding a plurality of resources from computers in a multi-computer database system, the first information including a program identifier, a resource identifier, a hold time, and a wait time;
   creating a first table that includes the first information of programs from one of the multi-computer systems;
   creating a second table that includes the first information of programs from another of the multi-computer systems;
   sorting the first information by resource identifier, hold time, and wait time to generate a sorted list;
   determining an identifier for a program associated with a first row of the sorted list when the first row has a non-zero hold time for a particular resource;
   identifying a second row of the sorted list that has a non-zero wait time for the particular resource;
   linking a row of the second table corresponding to the second row of the sorted list with a row of the first table corresponding to the program associated with the first row of the sorted list using the identifier when the first information of the second row of the sorted list is stored in the second table;
   linking another row of the first table corresponding to the second row of the sorted list with the row of the first table corresponding to the program associated with the first row of the sorted list using the identifier when the first information of the second row of the sorted list is stored in the first table;
   repeating the determining, identifying, and linking for all rows of the sorted list with a non-zero hold time;
   identifying a first program of the plurality of programs, executing on a first computer of the multi-computer database system, that is waiting on a first resource of the plurality of resources;
   identifying a second program of the plurality of programs, executing on a second computer of the multi-computer database system, as the ultimate holder of the first resource by using the first table and the second table; and
   displaying a second information corresponding to the first program and the second program,
   wherein the method is performed on a periodic basis.

2. The method of claim 1, wherein the act of collecting a first information comprises:
   receiving a first program information from a database program executing on the first computer;
   receiving a second program information from a database program executing on the second computer; and
   combining the first program information and the second program information as the first information.

3. The method of claim 1, wherein the second program is a holder of a second resource.

4. The method of claim 1, the periodic basis is a configurable periodic basis.

5. The method of claim 1, wherein collecting the first information, identifying the first program, identifying the second program, and displaying the second information may also be performed upon demand.

6. The method of claim 1, wherein collecting the first information comprises:
   collecting a status indicator information for each of the plurality of programs.

7. The method of claim 1, further comprising:
   detecting a deadlock involving the first program,
   wherein the act of displaying a second information comprises:
   displaying a third information corresponding to the deadlock.

8. The method of claim 1, wherein the wait time indicates how long the first program has been waiting on the first resource.

9. The method of claim 1, wherein identifying the second program comprises:
   traversing, using the first table and the second table, a chain of programs of the plurality of programs that are both holding a resource of the plurality of resources and waiting on another resource of the plurality of resources until reaching the second program, which is not waiting on any resource of the plurality of resources; and
   identifying the second program as the ultimate holder of the first resource.

10. The method of claim 1, wherein the rows of the first table and the second table comprise a forward pointer and a backward pointer and, for a particular row that is a holder of a certain resource and a waiter on another resource, the backward pointer points to a row for a program waiting on the certain resource and the forward pointer points to a row for a program that holds the another resource.

11. The method of claim 1, wherein displaying the second information comprises:
    displaying a subset of the second information corresponding to the first program on first line; and
    displaying a subset of the second information corresponding to the second program on a second line.

12. The method of claim 1, wherein displaying the second information comprises:
    displaying the second information on a single line.

13. The method of claim 1, wherein displaying the second information comprises:
    formatting the second information as a multiline display;
    formatting the second information as a single line display; and
    displaying either the multiline display or the single line display responsive to receiving a display selection indication.

14. The method of claim 1,
    wherein the first program is waiting on the first resource and a second resource of the plurality of resources, and the method further comprises:
    identifying an ultimate holder of the second resource; and displaying information corresponding to the ultimate holder of the second resource.

15. The method of claim 1,
wherein the act of identifying a second program fails to identify the second program, and
wherein the act of displaying the second information comprises:
displaying information corresponding to the first program.

16. The method of claim 1, wherein the act of identifying the second program comprises:
identifying a third program that is an immediate holder of the first resource using the first table and the second table, wherein the third program is executing on the second computer of the multi-computer database system and is waiting on a second resource; and
wherein information corresponding to the third program is stored in a portion of a row of the first table corresponding to the first program.

17. The method of claim 16, wherein the rows of the first table and the second table comprise at least one holder area portion for storing the identifier.

18. The method of claim 17, wherein the act of identifying the second program comprises:
using the links in the holder area portions to identify the second program as an immediate holder of the second resource.

19. A non-transitory computer-readable medium with instructions for a programmable control device stored thereon wherein the instructions cause a programmable control device to perform the method of claim 1.

20. A networked computer system comprising:
a plurality of computers communicatively coupled, at least one of the plurality of computers programmed to perform at least a portion of the method of claim 1 wherein the entire method of claim 1 is performed collectively by the plurality of computers.

* * * * *